United States Patent [19]

Leber

[11] Patent Number: 5,364,432
[45] Date of Patent: Nov. 15, 1994

[54] METHOD FOR PRODUCING A COMPOSITE GLASS BODY WITH DRAWING OF CONCENTRIC MELTS

[75] Inventor: Helmut Leber, Hanau, Germany

[73] Assignee: Heraeus Quarzglas GmbH, Hanau, Germany

[21] Appl. No.: 44,595

[22] Filed: Apr. 9, 1993

[30] Foreign Application Priority Data

Apr. 10, 1992 [DE] Germany .................... 4212099

[51] Int. Cl.⁵ ............................................. C03B 17/04
[52] U.S. Cl. ........................................ 65/17.3; 65/144;
65/66; 65/86; 65/126; 65/121; 65/DIG. 9;
65/32.5; 264/173
[58] Field of Search .................. 65/86, 144, 18.1, 145,
65/146, 87, 86, 66, 126, 121, DIG. 9, 32.5;
425/133.1

[56] References Cited

U.S. PATENT DOCUMENTS

| | | | |
|---|---|---|---|
| 2,313,296 | 3/1943 | Lamesch | 65/86 |
| 3,230,291 | 1/1966 | Walz | 65/126 |
| 3,298,808 | 1/1967 | Macks | 65/86 |
| 4,133,664 | 1/1979 | Aulich | 65/32.5 |
| 4,155,733 | 5/1979 | Sandbank | 65/86 |
| 4,195,982 | 4/1980 | Coucoulas | 65/134 |
| 4,372,771 | 2/1983 | Coucoulas | 65/86 |
| 4,385,916 | 5/1983 | Jochem | 65/126 |
| 4,466,818 | 8/1984 | Brongersma | 65/121 |
| 4,578,025 | 3/1986 | Ando | 425/133.1 |
| 4,784,679 | 11/1988 | Lentz | 65/145 |
| 4,923,497 | 5/1990 | Leber | 65/86 |

FOREIGN PATENT DOCUMENTS

| | | |
|---|---|---|
| A10067489 | 12/1982 | European Pat. Off. . |
| A20185362 | 6/1986 | European Pat. Off. . |
| A20344360 | 12/1989 | European Pat. Off. . |
| A10394640 | 10/1990 | European Pat. Off. . |
| A20476537 | 3/1992 | European Pat. Off. . |
| 0S2703706 | 8/1977 | Germany . |

OTHER PUBLICATIONS

"Continuous skull-melting of glass", Philips Tech. Rev. 42, No. 3, pp. 93–96, Oct. 1985.

Primary Examiner—W. Gary Jones
Assistant Examiner—John M. Hoffmann
Attorney, Agent, or Firm—Finnegan, Henderson, Farabow, Garrett & Dunner

[57] ABSTRACT

A method for producing an elongated composite glass body by melting at least two starting materials of different material compositions, feeding the starting materials to a drawing die disposed at the bottom of an externally heated melting crucible, and continuously drawing the melts vertically out of the drawing die to form a composite body laminated transverse to the drawing direction. To provide an interface free from impurities between the starting materials in the composite body and to enable the path of the interface to be freely shaped, the starting materials are fed in particle form continuously to a single melting crucible and heaped therein to form a preformed body in which one starting material lies directly next to the other starting material forming an interface line therebetween that extends substantially vertically and parallel to the drawing direction.

11 Claims, 2 Drawing Sheets

METHOD FOR PRODUCING A COMPOSITE GLASS BODY WITH DRAWING OF CONCENTRIC MELTS

BACKGROUND OF THE INVENTION

This invention relates to a method for producing an elongated composite glass body by melting at least two starting materials of different compositions, feeding the starting materials to a drawing die disposed at the bottom of an externally heated melting crucible, and continuously drawing the melts vertically out of the drawing die to form a composite body laminated transverse to the drawing direction. The invention also relates to an apparatus for producing an elongated composite glass body, comprising an externally heated melting crucible having a drawing die at the bottom thereof and a feed device for feeding at least two starting materials of different compositions into the melting crucible.

A method and apparatus of this type are known, for example, from German Patent No. DE-OS 27 03 706. This patent describes a method for the continuous production of an optical waveguide for optical communication, which waveguide consists of a core glass and an outer glass cover enclosing the core glass and having a lower refractive index than the core glass. In this method, the optical waveguide is drawn from a so-called double crucible. The double crucible consists of an externally heated outer crucible which contains the outer glass melt and in which is concentrically disposed an inner crucible which contains the core glass melt and whose side walls project above the upper surface of the outer glass melt. The bottom of the outer crucible is provided with a drawing die. An outlet opening is provided in the bottom of the inner crucible that is spaced vertically above the drawing die, the outlet opening of the inner crucible thus projecting into the outer glass melt, so that the core glass melt passing out of the inner crucible will be completely surrounded by the outer glass melt as they pass out of the drawing die of the outer crucible. The inner and outer crucibles are fed with the starting materials for the composite body independently and separately from one another by continuously adding glass rods composed of the starting materials to the respective melts. Both the inside and the outside crucible are made of sheet platinum. It is known that platinum starts to dissolve in glasses at temperatures above 900° C. In addition, it is possible that platinum particles will be detached from the crucible walls and be entrained by the melt flowing along the crucible walls.

In European patent application No. EP-A2 0 185 362 an apparatus is described for continuously producing optical fibers composed of two different materials, in which the glass-forming starting materials for the composite body and doping agents in reactive, liquid form are fed to a double crucible at room temperature. The inner and outer crucibles of the double crucible are disposed concentrically to one another and their conically tapering outlet openings are disposed vertically above one another. The inner crucible is movable in the vertical direction inside the outer crucible. The top part of the double crucible, in which the liquid starting materials react with one another to form a partly solidified mass, is surrounded by a hardening furnace, the temperature of which increases, from top to bottom, from room temperature to hardening temperature. The lower part of the outer crucible extends into a second furnace, which likewise has a temperature gradient from top to bottom, with a maximum temperature in the bottom part sufficiently high to soften the composite mass to such an extent that a composite fiber can be drawn from it out of a drawing die at the bottom of the outer crucible.

These known methods for the production of a composite body of glass have the common feature that two starting materials are melted or collected in separate crucibles, one crucible being disposed as an inner crucible inside the other and which has at least one outlet opening projecting into the second, outer crucible. Particularly at the high temperatures encountered and with aggressive starting materials, this can lead to reactions with the material of the inner crucible, which may for example result in abrasion of the inner crucible or the production of inhomogeneities, such as, at the surface of contact between the inner crucible and the starting materials for the composite body. After the composite body has been drawn, these inhomogeneities or impurities intensify at the interface between the different starting materials, where they are usually particularly troublesome.

In the known methods, the spatial distribution of the two starting materials inside the composite body can be adjusted within certain limits by adjusting the distance between the outlet opening of the inner crucible and the drawing die of the outer crucible and by varying the geometry of the die openings. The double crucible designs needed for this purpose, or the conversion procedures required are, however, expensive. In the dimensioning of the die openings, taking into account the viscosities of the melts during drawing, care must also be taken to ensure that they do not clog the outlet opening of the inner crucible disposed concentrically inside the outer crucible and therefore inside a relatively colder region of the melt.

If the inner and outer crucibles are kept at a constant temperature and in a fixed spatial relation to one another, the spatial distribution of the starting materials inside the composite body will be dependent on the filling levels of the melts in the respective crucibles (with the same pressure above the melt). If the spatial distribution of the starting materials in the composite body is to be constant, the problem then arises of keeping the height of the melt surfaces at a constant level or in a constant proportion to one another.

The problem underlying the invention therefore is to provide a method of the type first mentioned above for producing a composite glass body, wherein a homogeneous interface free from impurities is formed between the starting materials in the composite body, and in which the path of the composite body interface between the materials of the composite body can be shaped in a simple manner and with flexibility, and also that of making available a simple, trouble-free apparatus for producing such composite bodies, which is particularly suitable for producing composite bodies at high temperatures and which permits the shaping of the composite body interface in a simple manner and with a great deal of flexibility.

SUMMARY OF THE INVENTION

According to the invention, this problem is solved, as far as the method is concerned, by continuously feeding starting materials in particle form to a single melting crucible where they are heaped to make a preformed composite mass, in which the starting material of one composition is located directly next to the starting material of another composition on an interface line that extends substantially parallel to the drawing direction, and which is drawn off through the drawing die. Owing to the fact that the starting materials are fed to a single melting crucible and are heaped to make a preformed composite mass in such a manner that the starting material of one composition will lie directly next to the starting material of the other composition on an interface extending substantially parallel to the drawing direction, the interface between the starting materials is prevented from forming on a surface or a face in contact with the material of a crucible. Impurities or inhomogeneities in the interface regions of the composite body produced, such as may be caused, for example, by the material of a crucible in the known methods, are thus completely eliminated. Owing to the fact that the starting materials are fed continuously to the melting crucible in particle form and are heaped therein to make a preformed composite mass, with a predeterminable planar distribution of the different starting materials, any desired spatial distribution of the material properties can be provided. Because of the solid state of the starting materials, mutual mixing is largely avoided as they are introduced into the melting crucible. Through the use of a common melting crucible for the different starting materials, their spatial distribution within the composite mass is also independent of the height of the heaped material in the melting crucible. The melting of the starting materials in particle form in the melting crucible is effected only in the region of the preformed composite mass. In other words, only in the region in which the starting material of one composition lies directly next to the starting material of the other composition on an interface extending substantially vertically and parallel to the drawing direction and at a temperature at which their viscosity in the region of the drawing die of the melting crucible is so low that the drawing die is not clogged. If necessary, the drawing die, which is readily accessible from outside, can be additionally heated.

The method is found to be particularly advantageous when the starting material used is quartz glass or glass having a high silicic acid content. In this case the starting materials can, for example, differ in respect of their purity or their concentration of doping agents. Because of the slight dependence of viscosity on temperature, with quartz glass or glass having a high silicic acid content, even with a relatively high temperature gradient within the melting crucible, laminar flow conditions are maintained and the intermixing of the starting materials in the region of the composite mass interface is largely avoided.

Where the apparatus is concerned, the problem indicated above is solved by providing an apparatus comprising a single melting crucible having a drawing die disposed at its bottom, and a guide device for feeding each starting material in particle form into a predetermined region of the melting crucible. Apparatus having only one melting crucible is particularly simple and trouble-free. Furthermore, the single outlet opening for the melts of the starting materials, namely the drawing die at the bottom of the melting crucible, is very accessible and, if necessary, can be easily cleaned or replaced. Because a guide device is provided for feeding each starting material in particle form into a predetermined region of the melting crucible, the path of the interface between the starting materials inside the melting crucible, and therefore also between the materials in the composite mass, can be shaped in a simple manner and with great flexibility. By "guide device" is meant an apparatus with which it is possible to distribute the starting materials for each composition in an aimed manner and in a planar arrangement inside the melting crucible, but which during the melting is itself disposed outside the melting crucible or at least above the melt.

To obtain a uniform heaping of the materials in the melting crucible and for the aimed feeding of the starting materials, particularly good results have been achieved with a feed device which is provided, at least at its end facing the melting crucible, with guide tubes disposed coaxial to one another, the starting materials being fed to the melting crucible via the tube openings or the gap or gaps between the tubes disposed concentrically to one another.

The spatial distribution of the starting materials in the melting crucible can be adjusted in a particularly simple manner with a feed device in which the guide tubes are mounted for movement in the vertical direction. In this arrangement the guide tubes are advantageously movable both as far down as the bottom of the melting crucible and in relation to one another.

BRIEF DESCRIPTION OF THE DRAWINGS

One embodiment of the invention is explained more fully below and illustrated in the drawings, in which.

DETAILED DESCRIPTION OF THE INVENTION

Figure 1:
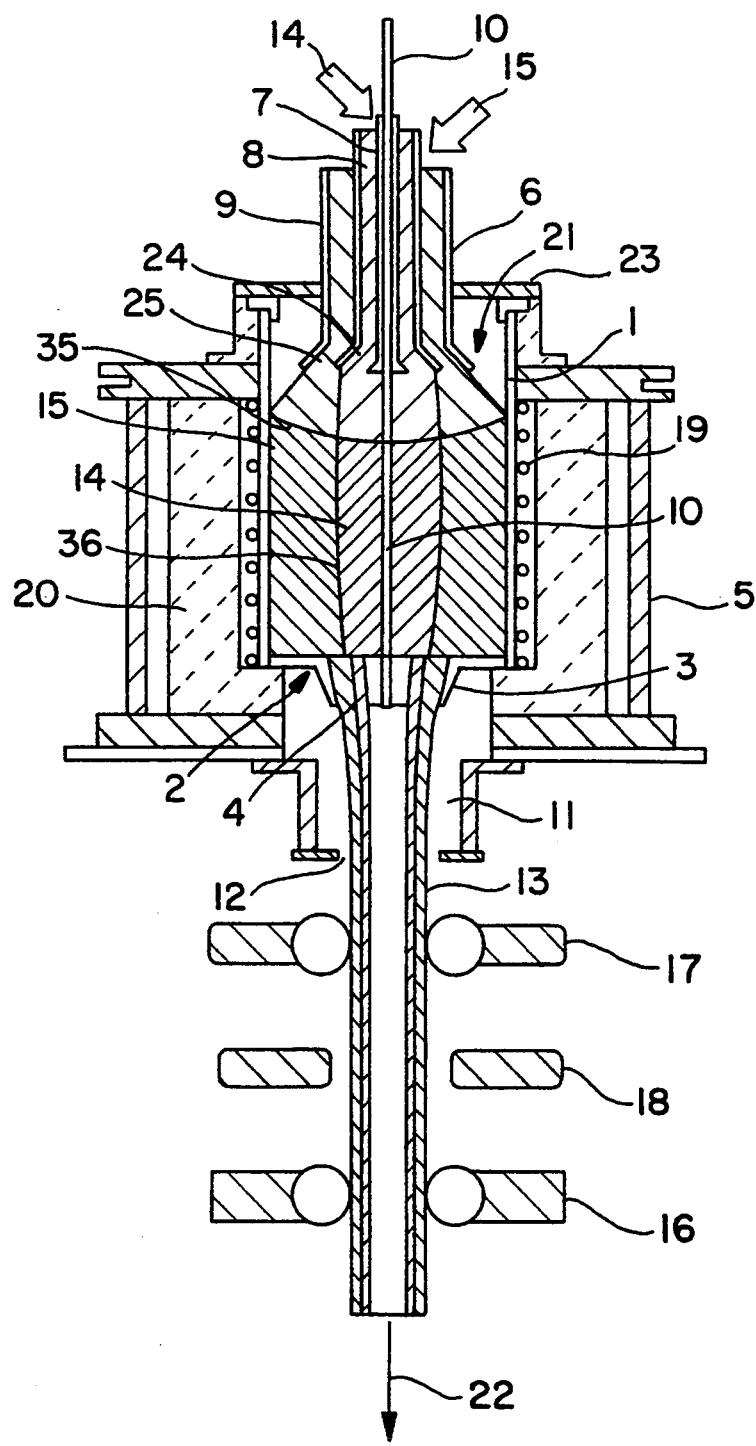
FIG. 1 illustrates schematically the apparatus of the invention for producing a tubular composite body.

The apparatus shown in FIG. 1 includes a melting crucible whose bottom 2 is provided with a drawing die having an annular outlet opening 4. A feeding means comprising a guide device 6 for feeding melt material in particle form is disposed above melting crucible 1, which is situated inside a heatable annular furnace 5. Guide device 6 comprises essentially three guide tubes 7, 8, 9 which are coaxially disposed and are movable in the vertical direction relative to one another, and whose ends facing the melting crucible 1 widen conically or taper conically forming two openings 24, 25. In the region of their conical ends, the maximum outside diameter of the inner guide tubes 7 and 8 is larger than the minimum inside diameter of the neighboring guide tubes 8 or 9, respectively, which lie further towards the outside. Guide tubes 7, 8 and 9 serve as a guide device for the starting materials 14, 15 in particle form that are to be fed to the melting crucible. Vertical movement of the guide tubes relative to one another, enables openings 24 and 25 between the tubes, and therefore the amount of the starting materials fed, to be varied in a simple manner. Inside innermost guide tube 7 is a supply pipe 10 for a protective gas that extends through melting crucible 1 and through drawing die 3 into a chamber 11 at the bottom of the crucible into which drawing die 3 projects. Chamber 11 has an opening 12 at its end remote from drawing die 3, through which the composite body 13 being produced is drawn through by means of a drawing device 16. As composite body 13 is being drawn off, it passes through a guide device 17 and a thickness measuring device 18.

Melting crucible 1 is preferably made of tungsten and can be pressure sealed by means of a cover plate 23, through which the guide tubes 7, 8, 9 of the guide device 6 extend. Heating elements 19 are provided in furnace 5 for heating the crucible that are insulated towards the outside by a thermal insulation layer 20.

When the starting materials are fed to the melting crucible through outlet openings disposed concentrically to one another, particularly uniform heaping is achieved, while the outlet openings, viewed in the direction in which the starting materials in particle form are fed, may have any desired cross section. Intermixing of the starting materials is thereby largely avoided.

It has been found particularly advantageous to draw the melt of the starting materials through a drawing die of annular shape to form a multilayer tube, while gas is being introduced through gas supply pipe 10 extending centrally to the annular die into the interior of the tube. The circular middle part of the drawing die can then be held in a particularly simple manner by means of the bottom end of the gas supply tube, although it may also be joined to the outer ring of the drawing die by a plurality of arms. This form of construction of the apparatus for the production of a composite body of glass is suitable for producing a composite body in the form of a multilayer tube.

In a preferred form of construction, the drawing die projects into chamber 11 which contains a protective gas and is open as described in the drawing direction. This space prevents the access of a damp or reactive atmosphere from contacting the still hot surface of the composite body during its first cooling phase.

Melting crucibles containing tungsten or molybdenum have proved to be particularly trouble-free, simple to maintain and resistant to abrasion. The walls of the melting crucible may have to be protected against attack by reactive gases. In view of this fact it is advantageous to give the melting crucible a closable construction to avoid the penetration of moisture or gases which could react with the hot material of the melting crucible. In addition, in case a superatmospheric pressure is needed, it can also be maintained in the melting crucible.

It has been found that feeding of starting materials with a particle size between 20 $\mu$m and 2 mm and preferably between 100 $\mu$m and 300 $\mu$m to the melting crucible is particularly advantageous. Through the use of corresponding pourable or flowable grains, on the one hand uniform feeding of starting material into the melting crucible and uniform filling of the latter are ensured, and on the other hand the intermixing of the grains of the individual starting materials in the region of their interfaces is largely avoided. In this respect it has been found particularly advantageous to select as narrow as possible a particle size range for the starting materials of a composite body, and to make it approximately the same for all the starting materials.

It has also been found advantageous to maintain a temperature gradient over the height of the melting crucible with the temperature increasing in the direction in which the composite body is drawn off. Both the speed of the process of diffusion of the starting materials into one another and the mixing of the starting materials with one another are to a great extent dependent on the temperature in the melting crucible. Through the formation of a temperature gradient over the height of the melting crucible, it is ensured that such processes, if they occur at all, will take place only in the region immediately around the drawing die and that excessive intermixing of the starting materials thus will be avoided.

The starting material is advantageously supplied to the melting crucible in a preheated state and in an atmosphere of protective gas. Superficially attached impurities, such as water, for example, can be removed by the preheating of the starting material in particle form. Feeding the starting materials into the melting crucible in an atmosphere of protective gas avoids attack by gaseous impurities on the starting materials in the hot furnace atmosphere. At the same time, the flow of protective gas makes it possible, if necessary, to set a superatmospheric pressure in the melting crucible. This has been found to be advantageous for maintaining a uniform, laminar flow of starting materials in the direction of the drawing die. The height of the superatmospheric pressure required in the melting crucible depends, for example, on the viscosities of the starting materials in the region of the drawing die, the particle size distribution employed, and the speed desired for drawing off the composite body from the melting crucible.

The method according to the invention for producing a composite body of glass with the aid of the apparatus illustrated in FIG. 1 is described below as an example. Two starting materials 14, 15 of different material compositions are fed to melting crucible 1 by way of the guide tubes 8, 9. The starting materials 14, 15 consist of quartz glass in particle form, with a particle size distribution between 100 $\mu$m and 300 $\mu$m. A starting material 15 of natural quartz glass is fed to the melting crucible 1 by way of the guide tube 9, while a starting material 14 of high-purity, synthetic quartz glass is fed thereto by way of the guide tube 8. By means of the guide tubes 7, 8, 9 the quartz glass starting materials 14, 15 can be fed into predetermined regions of the melting crucible 1. In the melting crucible 1 a preformed composite mass 21 is thus continuously heaped up, in which quartz glass particles of composition 14 lie directly next to quartz glass particles of composition 15 at an interface line 36 extending substantially vertically and parallel to the drawing direction, which is indicated by the arrow 22. In melting crucible 1, the preformed composite mass 21 is heated to form a melting front 35 extending under guide device 6, the temperature of the annular furnace 5 being between 1800° C. and 2300° C. The viscosity of preformed composite mass 21 is thereby lowered in the bottom region of the melting crucible 1 in such a manner that the preformed composite mass 21 passes through drawing die 3 and is drawn off through the latter at a drawing speed of between 2 m/h and 3 m/h in the drawing direction 22 as a tubular composite glass body 13 having an outer diameter of 150 mm and a wall thickness of 20 mm.

The thickness ratio of the layers of the composite body 13 is dependent on the quantitative ratio of the starting materials 14, 15 fed to the melting crucible 1. This quantitative ratio can be adjusted by moving the guide tubes 7, 8, 9 in the vertical direction, with consequent variation in the openings 24, 25 between the respective guide tubes 7, 8, 9 to a value between 0% and 100%. Thus, for example, at the beginning of the production process, with the melting crucible 1 empty, innermost guide tube 7 can be raised up onto the conically tapering inner surface of the guide tube 8, or visa versa, whereby gap 24 between guide tubes 7 and 8 is closed and the feeding of quartz glass particles 14 from guide tube 8 into the melting crucible 1 prevented. At the same time, by lowering middle guide tube 8, the gaps 25 between the outside of tube 8 and the inwardly tapering inside surface of guide tube 9 can be enlarged. Only quartz glass particles 15, which are typically of a cheaper grade, are thus fed first to melting crucible 1, which will be filled with the corresponding quartz glass particles 15 before the gap 24 between the inside of the guide tube 8 and the outside of the guide tube 7 is opened. This first crucible filling is drawn off in a preliminary run, while thermal equilibrium is also being established inside the melting crucible. It is also possible to lower all the guide tubes 7, 8, 9 onto the bottom 2 of the melting crucible 1 at the beginning of the process of producing the composite body 13 and, as the preformed composite mass 21 is formed by continuously feeding the quartz glass particles 14, 15 through the gaps 24, 25, to raise them gradually to the desired height of the preformed composite mass 21.

By the method described it is, for example, possible to produce composite tubes comprising an inner layer of high-purity synthetic quartz glass and an outer quartz glass layer of natural raw material, for use as a diffusion tube for the production of semiconductors. When appropriate glass compositions are used, another example of application is the production of composite tubes of quartz glass comprising a doped outer layer and an undoped inner layer for encasing tubes of lamps.

Figure 2:
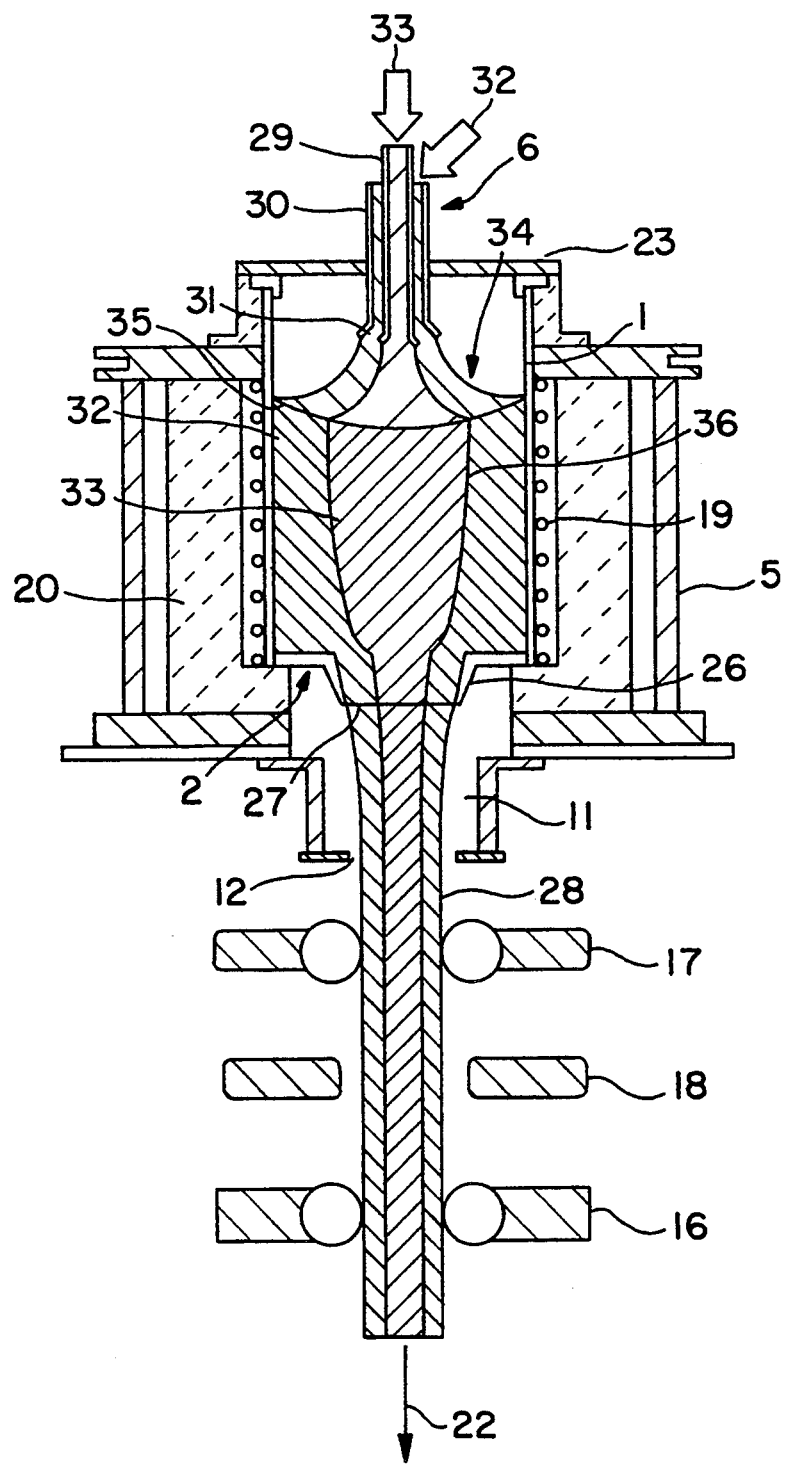
FIG. 2 illustrates schematically an apparatus for producing a rod-like composite body.

In the apparatus of the invention shown in FIG. 2, the drawing die 26 disposed at the bottom 2 of melting crucible 1 is provided with a circular opening 27. A rod-shaped composite body 28 is drawn by means of the drawing device 16 out of the circular opening 27, which has a diameter of 100 mm. The guide device 6 in this embodiment comprises two guide tubes 29, 30 which are disposed coaxially to one another and are vertically movable relative to one another and whose bottom ends facing the melting crucible 1 widen out conically in each case. The maximum outer diameter of the outlet end of inner tube 29 is larger than the inner diameter of the outer tube 30, so that the gap 31 between the two guide tubes 29, 30 can be closed by raising inner guide tube 29. Pure, synthetic quartz glass 32 in particle form and quartz glass 33, doped with germanium, for example, and in particle form are fed to melting crucible 1 through gap 31 between the guide tubes 29, 30 and through guide tube 29, respectively, and are heaped up in melting crucible 1 to form a preformed composite mass 34. The quartz glass starting materials 32, 33 in particle form are fed to the melting crucible 1 in an atmosphere of protective gas and preheated to a temperature of about 500° C. The preheating removes water adhering to the quartz glass particles before they are introduced into the melting crucible. In melting crucible 1, which is pressure-sealed closed by a cover plate 23, a superatmospheric pressure is maintained by introducing the starting materials 32, 33 in an atmosphere of protective gas and through expansion of the latter. The preformed composite mass 34 is heated to a temperature of approximately 2,200° C. in the region of drawing die 26.

In FIG. 2, components corresponding to those of FIG. 1 have the same reference numerals. The parts of the apparatus which have not been explained in detail in connection with FIG. 2, can therefore be associated with the corresponding reference numerals and the explanations thereof in FIG. 1. With the apparatus illustrated in FIG. 2, for example, preformed bodies can be produced for use in making optical waveguides for optical communication.

I claim:

1. A method for producing a multilayered elongated composite glass body of at least two different materials laminated together along an interface that extends in the elongated direction of the body, said body being made from at least two starting materials of different glass compositions, comprising continuously feeding the starting materials in particle form to the top of the interior of a single, externally heated melting crucible to heap said starting materials in the crucible to form a preformed composite mass therein in which the starting material of one composition in the composite mass lies directly next to the starting material of another composition along an interface extending substantially vertically, heating the composite mass to form melts from each starting material, and continuously drawing the melts vertically out of a drawing die located at the bottom of the crucible to form said multilayered elongated composite glass body.

2. The method of claim 1 wherein the at least two different glass compositions each include quartz glass or glass having a high silicic acid content.

3. The method of claim 1 wherein the starting materials are fed to the top of the melting crucible through outlets arranged concentrically to one another.

4. The method of claim 1 wherein the starting materials comprise two different starting materials and wherein the melts from the two starting materials are drawn through a drawing die of annular shape to form a double-walled composite glass body tube.

5. The method of claim 4 wherein gas is introduced into the interior of the tube during the drawing thereof.

6. The method of claim 1 wherein the at least two starting materials have a particle size between 20 μm and 2 mm.

7. The method of claim 6 wherein at least two starting materials have a particle size between 100 μm and 300 μm.

8. The method of claim 1 wherein a temperature gradient is maintained over the vertical height of the melting crucible with the temperature increasing towards the bottom of the crucible.

9. The method of claim 1 wherein the starting materials fed to the melting crucible are in a preheated state.

10. The method of claim 1 wherein the starting materials are fed to the melting crucible in a protective atmosphere to avoid contamination of the starting materials in the heated crucible.

11. The method of claim 1 wherein the starting materials while in the melting crucible are subjected to a pressurized gas.

* * * * *